(12) United States Patent
Sasaki

(10) Patent No.: US 11,747,243 B2
(45) Date of Patent: Sep. 5, 2023

(54) METHOD OF PRODUCING TEST-SAMPLE FOR TRANSMISSION ELECTRON MICROSCOPE

(71) Applicant: Mitsubishi Electric Corporation, Tokyo (JP)

(72) Inventor: Hajime Sasaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 563 days.

(21) Appl. No.: 16/976,005

(22) PCT Filed: May 25, 2018

(86) PCT No.: PCT/JP2018/020100
§ 371 (c)(1),
(2) Date: Aug. 26, 2020

(87) PCT Pub. No.: WO2019/224993
PCT Pub. Date: Nov. 28, 2019

(65) Prior Publication Data
US 2021/0102872 A1     Apr. 8, 2021

(51) Int. Cl.
*G01N 1/28*     (2006.01)
(52) U.S. Cl.
CPC ..... *G01N 1/286* (2013.01); *G01N 2001/2873* (2013.01)
(58) Field of Classification Search
CPC ................ G01N 1/286; G01N 1/2806; G01N 2001/2873; G01N 2001/2886
See application file for complete search history.

(56) References Cited

U.S. PATENT DOCUMENTS

2008/0042059 A1*  2/2008  Tashiro ............... H01J 37/3056
                                                                            250/307

FOREIGN PATENT DOCUMENTS

| CN | 105699698 A | * | 6/2016 | ............ G01Q 30/20 |
|----|-------------|---|--------|------------------------|
| CN | 105699698 A |   | 6/2016 |                        |
| JP | 2008014899 A | * | 1/2008 |                       |
| JP | 2008070155 A | * | 3/2008 |                       |
| JP | 2008070155 A |   | 3/2008 |                       |
| JP | 2008170225 A | * | 7/2008 |                       |
| JP | 2008170225 A |   | 7/2008 |                       |

(Continued)

OTHER PUBLICATIONS

International Search Report issued in PCT/JP2018/020100; dated Aug. 21, 2018.

(Continued)

*Primary Examiner* — Bayan Salone
(74) *Attorney, Agent, or Firm* — Studebaker & Brackett PC

(57) ABSTRACT

In a method of producing a test-sample for a transmission electron microscope, it is so arranged that a massive body in a rectangular parallelepiped shape including a multiple quantum well active layer is cut out from a laser diode being a workpiece; thereafter, a test-sample is produced in which tilting oblique cutoff portions are formed at corner portions contiguously bordering on an upper surface of the massive body, so that surface-part active layers can be visually identified thereat; and thereafter, the test-sample is made thinner, and also an observation test-sample is cut out therefrom by taking on, as references, two surface-part active layers visually identifiable at the tilting oblique cutoff portions.

12 Claims, 7 Drawing Sheets

(56) References Cited

FOREIGN PATENT DOCUMENTS

JP         2010135132 A  *  6/2010
WO    WO-2019224993 A1  *  11/2019  ............ G01N 1/286

OTHER PUBLICATIONS

An Office Action mailed by China National Intellectual Property Administration dated Feb. 25, 2023, which corresponds to Chinese Patent Application No. 201880093642.7 and is related to U.S. Appl. No. 16/976,005; with English language translation.

* cited by examiner

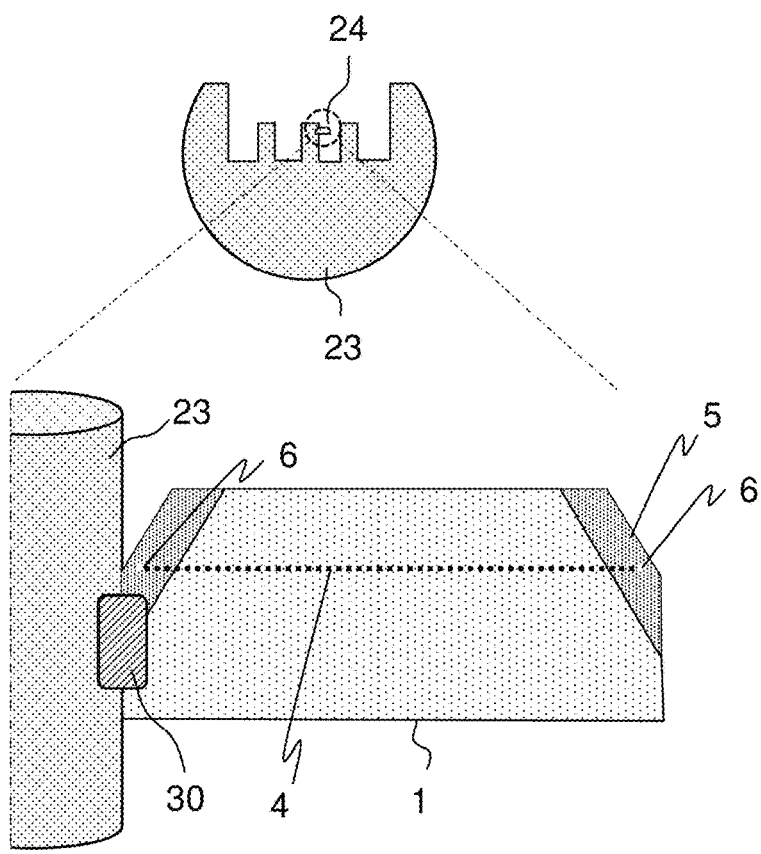
FIG. 12A
FIG. 12B
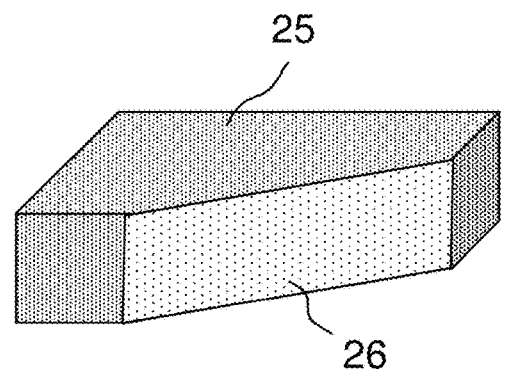
FIG. 13

METHOD OF PRODUCING TEST-SAMPLE FOR TRANSMISSION ELECTRON MICROSCOPE

TECHNICAL FIELD

The present disclosure of the application concerned relates to a method of producing a test-sample for use in a transmission electron microscope at the time of analyzing an internal structure of a compound semiconductor.

BACKGROUND ART

In a conventional production method of a test-sample for use in a transmission electron microscope, it has been performed that, at the time of cutting out a cross-sectional TEM (Transmission Electron Microscope) test-sample, one side of the test-sample is obliquely cut off, and a parallel state of the test-sample has been confirmed (for example, refer to Patent Document 1). In addition, it has been performed that, at the time of cutting out a planar TEM test-sample, markers are formed on its cross-sectional faces, and a parallel state of the test-sample has been confirmed.

RELATED ART DOCUMENTS

Patent Documents

[Patent Document 1] Japanese Patent Laid-Open No. 2008-070155
[Patent Document 2] Japanese Patent Laid-Open No. 2008-170225

SUMMARY OF THE INVENTION

Problems to be Solved by the Invention

In a conventional production method of a test-sample for a transmission electron microscope, either cross-sectional cutout or planar cutout is only performed. For this reason, in a conventional scheme, there arises a problem in that cutting out cannot be achieved by aiming at a specific place inside of a semiconductor device, for example, at one fault or defect residing within an active layer existing inside of the device.

In addition, at the time of cutting out a test-sample of cross-sectional TEM (a cutting out direction of Patent Document 1) or that of planar TEM (a cutting out direction of Patent Document 2), there arises a problem in that, because each of layers is formed by a hetero structure of semiconductors therebetween in a compound semiconductor device so that its structure member made of metal, an insulation film or the like cannot be directly seen from the outside, it is difficult to maintain the parallelism at the time of processing or working on the test-sample. In the exemplary prior-art cases described above, they individually state for production methods of a cross-sectional TEM test-sample and a planar TEM test-sample; however, no mention is made of suitably adopting for a case of a continuous performance from planar TEM working to cross-sectional TEM working.

The present disclosure of the application concerned has been directed at disclosing technologies for solving those problems as described above, wherein an object of the disclosure is to provide a working method for observing a desired observation portion(s) within a compound semiconductor device, and in particular, to provide a working method for producing a test-sample capable of being conveniently observed at the time of the working.

Means for Solving the Problems

A method of producing a test-sample for a transmission electron microscope disclosed in the present disclosure of the application concerned is a method residing in a feature that comprises:
a process step of cutting out, from a laser diode being a workpiece, a massive body in a rectangular parallelepiped shape including a multiple quantum well active layer residing in the laser diode;
a process step of producing a test-sample in which tilting oblique cutoff portions are formed, at two corner portions contiguously bordering on an upper surface of the massive body, each tilting with respect to the upper surface of the massive body;
a process step of making the test-sample thinner by working on the test-sample from a surface thereof until a thickness thereof reaches where the multiple quantum well active layer therein can be observed; and
a process step of cutting out an observation test-sample being columnar, from a test-sample formed with the tilting oblique cutoff portions, by using two of surface-part active layers each made of portions of the multiple quantum well active layer.

Effects of the Invention

According to the method of producing a test-sample for a transmission electron microscope disclosed in the present disclosure of the application concerned, it is made possible to provide a working method for observing a desired observation portion(s) within a compound semiconductor device. In addition, it becomes possible to conveniently produce an observation test-sample at the time of the working to observe the desired observation portion(s).

BRIEF DESCRIPTION OF DRAWINGS

FIGS. 12A and 12B are diagrams showing, by way of example, a case in which a test-sample whose tilting oblique cutoff portions are formed on its both sides is attached on a mounting mesh; and FIG. 13 is a diagram for explaining a production method of a cross-sectional TEM test-sample for forming a conventional oblique cutoff portion.

EMBODIMENTS FOR CARRYING OUT THE INVENTION

Embodiment 1.

Figure 1:
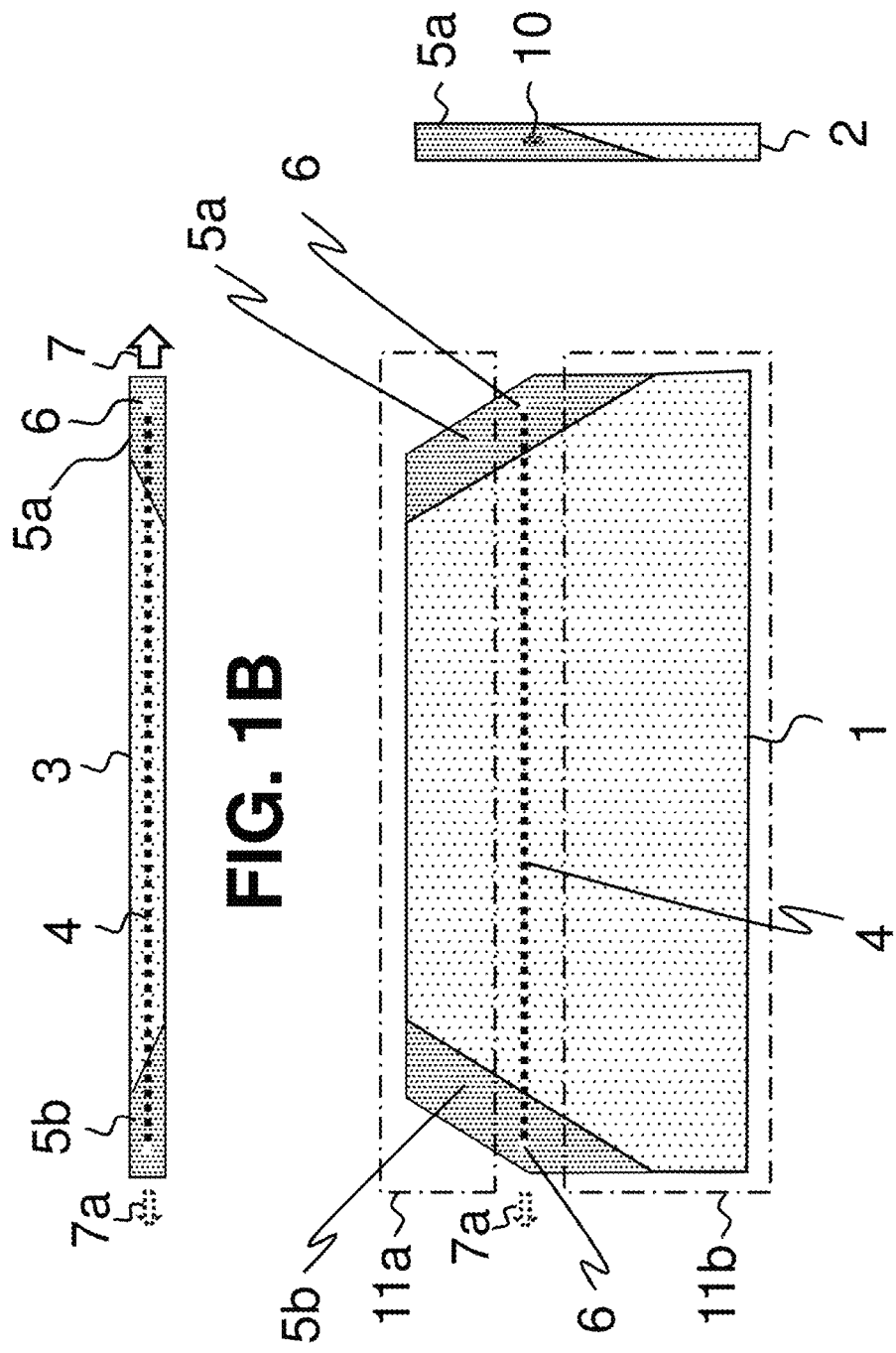
FIGS. 1A to 1C are diagrams showing, by way of example, a test-sample for a transmission electron microscope according to Embodiment 1.

Hereinafter, the explanation will be made referring to the drawings for a method of producing a test-sample for a transmission electron microscope according to Embodiment 1 of the present disclosure of the application concerned. FIGS. 1A to 1C are diagrams showing, by way of example, a test-sample for the transmission electron microscope according to Embodiment 1 of the disclosure of the application concerned. The diagram includes views each showing the test-sample in which a laser diode (hereinafter, referred to as an "LD" for the sake of simplicity; Laser Diode, LD) being a compound semiconductor device is cut out by surfaces.

In FIGS. 1A to 1C, FIG. 1A shown on the lower side thereof is a view viewed from above an LD's flat-shaped test-sample being cut out; FIG. 1B shown on the upper side from FIG. 1A is a top view of FIG. 1A; and FIG. 1C shown on the right side from FIG. 1A shows a right side view of FIG. 1A.

In an LD plan face 1 of FIG. 1A, a multiple quantum well active layer 4 (hereinafter, referred to as an "MQW active layer 4" for the sake of simplicity; the term "multiple quantum wells" is abbreviated as an "MQW") for generating a laser beam exists inside of semiconductors, so that the entirety of the active layer cannot be seen from an upper surface. To a slight extent, the active layer is at firsthand seen only at both ends of the dotted line as in hollow dots. Accordingly, in the figure, an existing place of the active layer is indicated by the dotted line.

Note that, the regions surrounded by alternate long and short dashed lines are work regions 11a and 11b which are to be cut off for further performing cross-sectional observation of the flat-shaped test-sample (these work regions are removed by means of slice working). These work regions 11a and 11b are each regions to be worked for observing in more detail a state of the MQW active layer 4 described above, and both include parts of tilting oblique cutoff portions 5a and 5b.

In addition, in FIG. 1B, shown are an LD side face 3 viewed above the top face, and the tilting oblique cutoff portions 5a and 5b which have oblique cutoff faces each for finding out marks for guidance used for cutting out a test-sample in parallel with an MQW active layer at the time of working on the test-sample, and are the portions thereof having been further cut off at predetermined angles with respect to the LD plan face 1 at the time of the working.

Moreover, with respect to the tilting oblique cutoff portion 5b which is formed on the left side of the LD plan face 1, formed at a symmetrical position on the right side of the LD plan face 1 separately from the tilting oblique cutoff portion 5b is the tilting oblique cutoff portion 5a which has a similar oblique cutoff face to the tilting oblique cutoff portion 5b, and is the portion having been further cut off at a predetermined angle with respect to the LD plan face 1. Note that, the hollow arrow is an arrow in which features of a laser beam 7 being emitted are indicated by the direction of the arrow and the magnitude thereof;

in order to indicate a distinction in which a laser beam with higher power is emitted from the right side of FIG. 1B in comparison with that from the left side thereof, the arrow on the right side is indicated by the solid line, and the arrow on the left side is, by the dotted line. Namely, toward the left side of FIG. 1B, the laser beam is hardly emitted because of a back-surface reflection coating film of the device.

Furthermore, in FIG. 1C, an LD front face 2 is shown which is viewed above the emitting face of the laser. In that part of the figure, the tilting oblique cutoff portion 5a described above is shown in an upper stage part; the indication shown as black dots in an ellipse shape within the tilting oblique cutoff portion 5a is a surface-part active layer (a portion where the inside active layer appears on a surface of the portion) 10.

Next, the explanation will be made for a method of producing a test-sample for a transmission electron microscope in FIGS. 1A to 1C in accordance with production process steps of the test-sample. First, the explanation will be hereinafter made referring to the drawings for the structure of a laser diode being a workpiece which becomes a subject matter to produce a test-sample.

Figure 2:
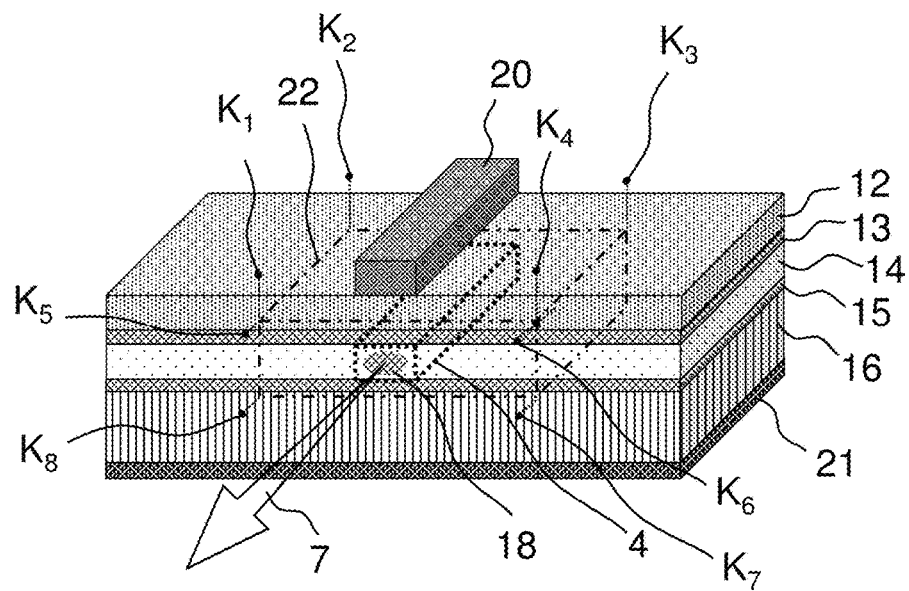
FIG. 2 is a schematic diagram of a laser diode.

FIG. 2 is a schematic diagram of a laser diode. The laser diode includes as its principal layers a contact layer 12 for obtaining ohmic contact between a compound semiconductor and a metal electrode, a clad layer 13 for confining or trapping a laser beam generated by the MQW active layer 4, and a block layer 14, being formed on the same surface with the MQW active layer 4, for concentrating an electric current only in the MQW active layer 4 so that the electric current flowed thereinto from the electrode does not needlessly flow. Here, a lower-side clad layer 15 makes a pair with the upper clad layer 13, and achieves a role to trap the laser beam between these two layers. Note that, the lower-side clad layer 15 is layered so as to be in contact with a surface of a substrate 16 made of a compound semiconductor.

Because the MQW active layer 4 described in FIGS. 1A and 1B exist inside of the LD, the MQW active layer cannot be seen from the outside. Accordingly, in the diagram, the existing place is indicated in a central portion of the laser diode by the broken lines. In addition, the MQW active layer 4 cannot be directly seen from the outside as described above, and thus, at the time of cutting out an observation test-sample for the transmission electron microscope, it is difficult to cut out the MQW active layer 4 by means of one-time working.

For dealing therewith, an existing region of the MQW active layer (being also a region of a planar TEM test-sample) indicated by alternate long and short dashed lines in the diagram is first cut out. A cutout region 22 is a region (of a rectangular parallelepiped which is defined by the point K1 through the point K8 being eight representative end-points) indicated by the alternate long and short dashed lines in the diagram, which is so arranged that those rough positions for the region to be cut out can be understood. Note that, in FIG.

2, a semiconductor's cross-sectional face emitting the laser beam corresponds to the respective LD front face of FIG. 1A; a semiconductor's cross-sectional face of the MQW active layer 4 viewed from its lateral side, to the respective LD side face of FIG. 1C; and a face viewed above the LD, to the respective LD plan face of FIG. 1B.

It should be noted that, the laser beam 7 is emitted by being energized using an upper electrode 20 and a lower electrode 21 so that an electric current flows through the LD being a device; the laser beam is emitted from a laser-beam emitting front end-face 18 of the MQW active layer 4 described above, in a direction of the hollow arrow in the diagram, in a mode in which an equal power contour-line of the output is distributed in an ellipse shape.

Figure 3:
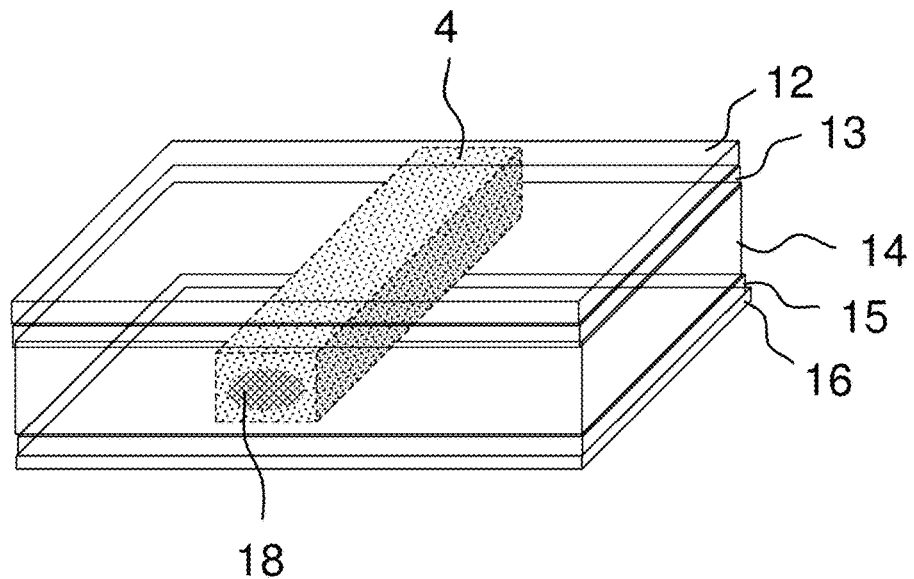
FIG. 3 is a diagram showing, by way of example, a test-sample in which a portion in the laser diode of FIG. 2 indicated by alternate long and short dashed lines thereof is cut out.

Next, the explanation will be made in succession of process steps for a method of producing a test-sample in the embodiment. Shown in FIG. 3 is a test-sample in which a portion in a laser diode indicated by the alternate long and short dashed lines of FIG. 2 is cut out by using a working method using an FIB (Focused Ion Beam) device (hereinafter, referred to as an "FIB working method," for brevity) or the like. Because, by means of the FIB working method, a thin test-sample cannot be directly extracted, a thick film test-sample including thereinside a region of MQW active layer wanted to be observed is first cut out from the device.

Figure 4:
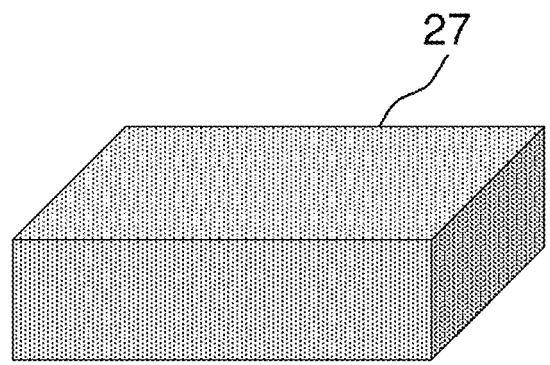
FIG. 4 is a diagram showing, by way of example, the test-sample on which an SEM observation is performed using an FIB device.

Because FIG. 3 is a diagram which is schematically illustrated, it can be understood that the diagram includes an MQW active layer thereinside; however, when the observation is actually performed by an SEM using an FIB device, the test-sample is simply seen as a solid or massive body 27 in a rectangular parallelepiped shape as in FIG. 4, so that the MQW active layer being a desired region cannot be distinguished.

For dealing therewith, hereinafter, the explanation will be made referring to the drawings for a first working process step in order to cut out the MQW active layer 4 which is the desired region. Here, in order to make clear the difference from a conventional working process step of a test-sample before explaining the first working process step, the explanation will be firstly made referring to FIG. 13 for the conventional working process step of the test-sample.

In the conventional working process step, as shown in FIG. 13, one portion of the massive body (a portion including one side-line and two vertexes being its end-points) is uniformly cut off by using an FIB device, from an upper surface of such a massive body 27 being the thick film test-sample described above in a direction perpendicular with respect to an LD plan face, by the quantity of the thickness of the massive body; namely, a region in a triangular prism shape is cut off by a surface perpendicular with respect to two faces sandwiching one side-line of the massive body in a rectangular parallelepiped shape described above, so that a cross-sectional TEM test-sample 25 on which an oblique cutoff portion 26 is formed has been produced. A shape of the oblique cutoff portion 26 (a shape of a cutoff face) being produced according to the working process step is made rectangular parallelepipedic as shown in the figure.

Figure 5:
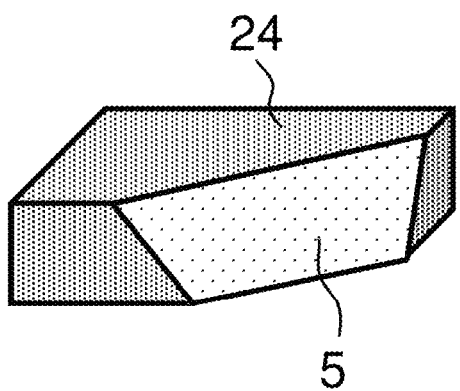
FIG. 5 is a diagram showing, by way of example, a test-sample in which tilting oblique working is performed thereon from its upper surface by means of an FIB device.

For dealing therewith, in the embodiment, the working is performed to form a tilting oblique cutoff portion 5 as shown in FIG. 5, using an FIB device, by cutting off a corner portion (hereinafter, a similar portion is simply referred to as a "corner portion") which is a portion including one sideline of a massive body in a rectangular parallelepiped shape and two vertexes being the side-line's end-points. Namely, in an angular direction not perpendicular with respect to each face of two faces sandwiching one side-line of the massive body in the rectangular parallelepiped shape described above, one portion of the massive body is cut off by the quantity of the thickness of the massive body, so that a cross-sectional TEM test-sample 24 (hereinafter, simply referred to as the test-sample 24) is produced in which the tilting oblique cutoff portion 5 is formed whose shape of the cutoff face takes on a trapezium or trapezoid. Note that, the figure shows an SEM image of the test-sample 24, so that a surface-part active layer cannot be visually identified.

Figure 6:
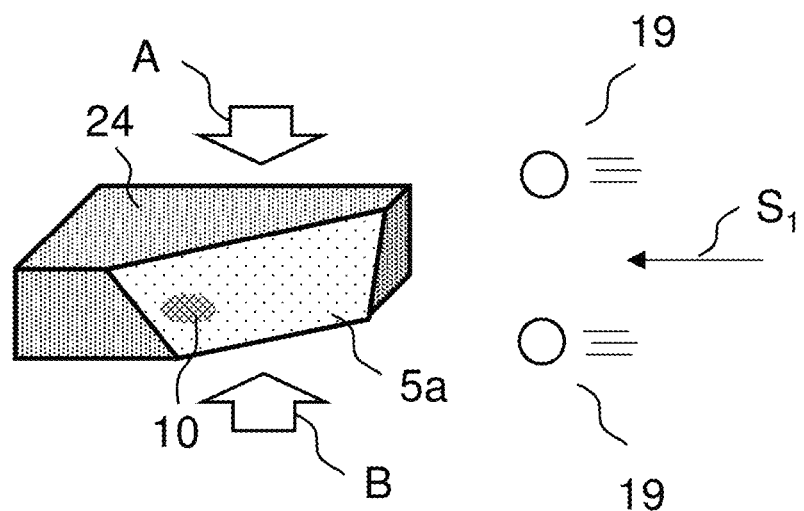
FIG. 6 is a schematic diagram illustrating an appearance in which, by means of an FIB device, Ga-ion beams are irradiated away from a lateral side of a test-sample so as to make it thinner.

At the following process step, ion beam working is performed by means of an FIB device in which the test-sample 24 explained referring to FIG. 5 described above is made thinner in its across-the-thickness direction. Namely, as illustrated in FIG. 6, gallium-ion or Ga-ion beams 19 are irradiated by using an FIB device individually from an upper-side position of the aforementioned test-sample 24 on a lateral side thereof and from a lower-side position thereof, so that the test-sample is cut off in succession from the top face of the test-sample and from the bottom face thereof (in the figure, sequentially in the directions of hollow arrow "A" and hollow arrow "B"), respectively. According to the working, the test-sample 24 is made thinner, so that a test-sample 24a (not shown in the figure, but will be described later) is produced. FIG. 6 is a diagram, differing from the SEM image shown in FIG. 5, illustrating an SIM image in a case in which the test-sample 24 is observed by a scanning ion microscope (also referred to as an "SIM," Scanning Ion Microscope). In this case, as illustrated in the figure, the surface-part active layer 10 being one part of the MQW active layer 4 can be visually identified on a surface of the tilting oblique cutoff portion 5a at a corner portion of the test-sample 24.

That is to say, the MQW active layer 4 cannot be visually identified through the SEM image as shown in FIG. 5; however, through an SIM image by means of an SIM which is an observation method using ions, it is possible to visually identify the surface-part active layer 10 that is a portion where the MQW active layer is exposed on the cross-sectional face as illustrated in FIG. 6 (in this case, the arrow $S_1$ indicates a direction to observe a test-sample; in the figure, the direction is for seeing the test-sample from a lateral side. In addition, the numerical subscript 1 of the symbol $S_1$ is the numeric character for indicating an observation method at the time of observing a test-sample, in this case, for indicating its observation at the time of FIB working on it, which is applicable in the following figures also in a similar fashion). The reason why it is possible to visually identify through the SIM image is that emission probabilities of secondary electrons are different between an SIM and an SEM; it is because the former has a higher emission probability.

Note that, in this case, the thickness of a test-sample being made thinner is from 0.1 μm to 2.0 μm. Because the thickness of a test-sample for an ordinary TEM observation is 0.1 μm or less, it can be understood that, in a case shown in FIG. 6, a thicker test-sample is worked on than the ordinary observation test-sample is. This is for the purpose of an arrangement by which the MQW active layer 4 being the portion wanted to be observed is not cut down at the process step in this stage.

By the way, also in an exemplary prior-art case (refer to Patent Document 1), an example is reported in which oblique cutting is performed for obtaining a flat surface of a test-sample; however, the example is not an example of a planar TEM, but an example of ordinary cross-sectional TEM working and also a worked example in a case in which a structure member being an object subject to observation can be visually identified through an SEM image on a device being the basis of the test-sample for the observation. On the other hand, in a case in which the cross-sectional TEM working is performed following after the planar TEM working as in the embodiment, and also in a case in which a structure member being an object subject to observation cannot be visually identified at its surface portion through an SEM image, the working which applies the exemplary prior-art case thereto is impossible.

In addition, in an exemplary prior-art case (refer to Patent Document 2), a method is disclosed in which markers are formed at an active layer part in advance, and the working is performed by keeping the markers being seen while maintaining the parallelism with the active layer part in a test-sample; however, a process step for forming those markers is required. On the other hand, in the embodiment, it is possible to perform the working while maintaining the parallelism with an active layer portion in a test-sample without forming a marker(s) thereat (as will be described later), and so, there exists an effect that a process step for forming those markers as in the exemplary prior-art case can be eliminated.

Figure 7:
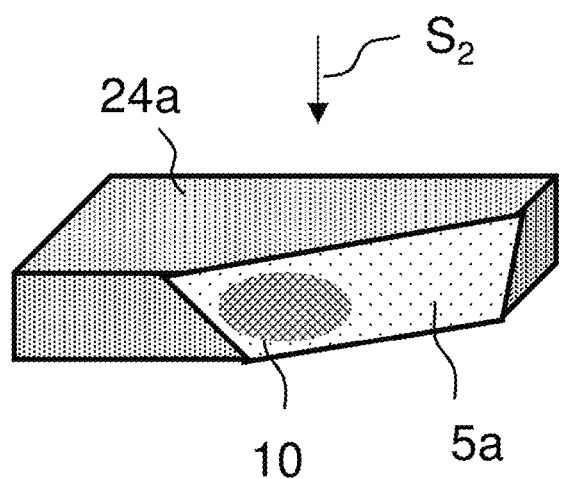
FIG. 7 is a schematic diagram illustrating an appearance in which a test-sample having been made thinner is observed above the top face thereof by an ultra-high-voltage transmission electron microscope.

FIG. 7 illustrated next is a schematic diagram in a case in which the test-sample 24a having been made thinner, though it is a test-sample whose thickness is in the degree of 1 μm, is observed above the top face by an ultra-high-voltage transmission electron microscope (refer to the arrow $S_2$ for the observation direction in the figure; note that, the numerical subscript 2 of the symbol $S_2$ is the numeric character for indicating an observation method at the time of observing a test-sample, in this case, for indicating the observation by means of an ultra-high-voltage transmission electron microscope, which is applicable hereinafter in a similar fashion). As shown in the figure, even in a case of such a thick test-sample, the test-sample can be observed by using an ultra-high-voltage transmission electron microscope for the observation because its transmission property of electrons is high; on the contrary, through an SIM image at the time of FIB working and through an SEM image as having been explained referring to FIG. 5, the surface-part active layer 10 cannot be observed within the tilting oblique cutoff portion 5 being formed at a corner portion in the test-sample.

A general transmission electron microscope operates at an acceleration voltage from 200 kV to 300 kV; however, in a case of an ultra-high-voltage transmission electron microscope, electrons are accelerated by its acceleration voltage of 1 MV or more, and thus, it is possible to observe a film whose thickness is 0.1 μm or more, in the degree of 2 μm, being a thick film in comparison with a case in which the general transmission electron microscope is used. In addition, depending on the material of a film to be observed, it is possible to observe a film of its thickness in the degree of 5 μm. Through the observation, it is possible to identify a desired observation portion even in a case of a thicker film than usual.

It should be noted that, after being observed by a CCD or the like, a specific portion (a portion being stored in memory for later usage) is stored in a memory, and, from that time onward, is used after being retrieved from the memory at the time of working a test-sample on an as-needed basis. To be specific, by means of an ultra-high-voltage transmission electron microscope, a targeted object is taken by a CCD as a photograph, which is stored in the memory.

As for a specific portion, its verification is performed from the data obtained by a CCD or the like, for example, whether a desired observation portion exists at a position of some micrometers from the end(s) of a test-sample. And then, based on the data having been verified, the working is performed on the test-sample by an FIB device. At the time of FIB working, the working cannot be usually performed while directly seeing a targeted object; and thus, at the time of the working, the working is performed on a required portion(s), while relying on the data obtained by the CCD described above, by means of a distance conversion from the end(s) of the test-sample.

Figure 8:
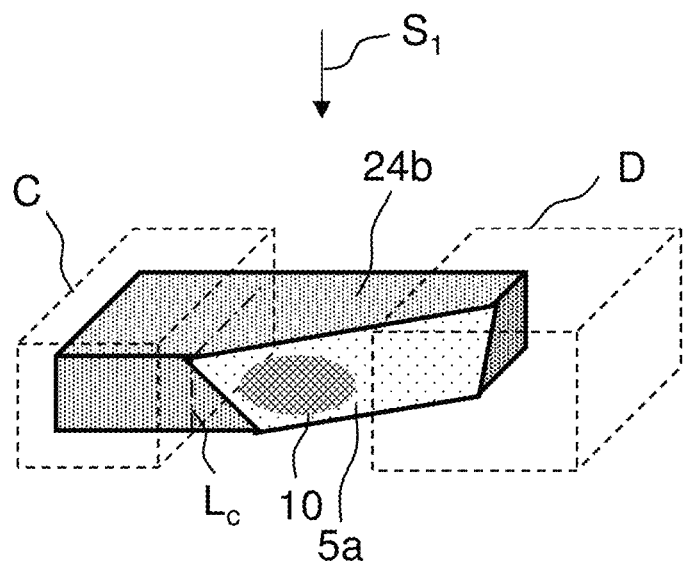
FIG. 8 is a schematic diagram for explaining an FIB working method for performing a cross-sectional observation after having identified an observation portion.

FIG. 8 is a schematic diagram for explaining an identification method of a portion which should be observed within an LD, and an FIB working method for extracting a test-sample on which a cross-sectional observation is performed after the identification.

Conventionally, during the working of a test-sample, the MQW active layer 4 could not have been seen from and above an upper surface in a figure corresponding to an LD plan face of the test-sample. Additionally, in general, a planar TEM test-sample is thin; and thus, a case is not usually conceivable in which cross-sectional working is further performed, and then the observation is performed from the cross-section.

For dealing therewith, in the embodiment, utilized is a test-sample which is a test-sample 24b whose tilting oblique cutoff portion 5a at its corner portion being indicated by patterning it on a dot by dot basis as shown in FIG. 8 is produced by means of the working. By using the test-sample in which the tilting oblique cutoff portion 5a is produced, it is possible to observe the surface-part active layer 10 of the aforementioned tilting oblique cutoff portion 5a also away from any one of faces of the top face of the test-sample 24b corresponding to the LD plan face as shown in the figure, and the side face thereof corresponding to the LD front face in the figure. And then, by relying on the surface-part active layer 10, a portion which should be observed within the LD is firstly identified by means of the observation above the top face of the test-sample 24b.

Subsequently, in the test-sample 24b whose observation portion has been identified, the cutting is proceeded by an ion beam(s) on a region "C" surrounded at the left side of the figure by the rectangular parallelepiped of broken lines, and on a region "D" surrounded at the right side of the figure by the rectangular parallelepiped of broken lines, each of which is situated outside of a region in which an MQW active layer being the identified observation portion exists (for example, as for the region "C," the cutting is proceeded from a left-end portion of the test-sample to a boundary line Lc).

Figure 9:
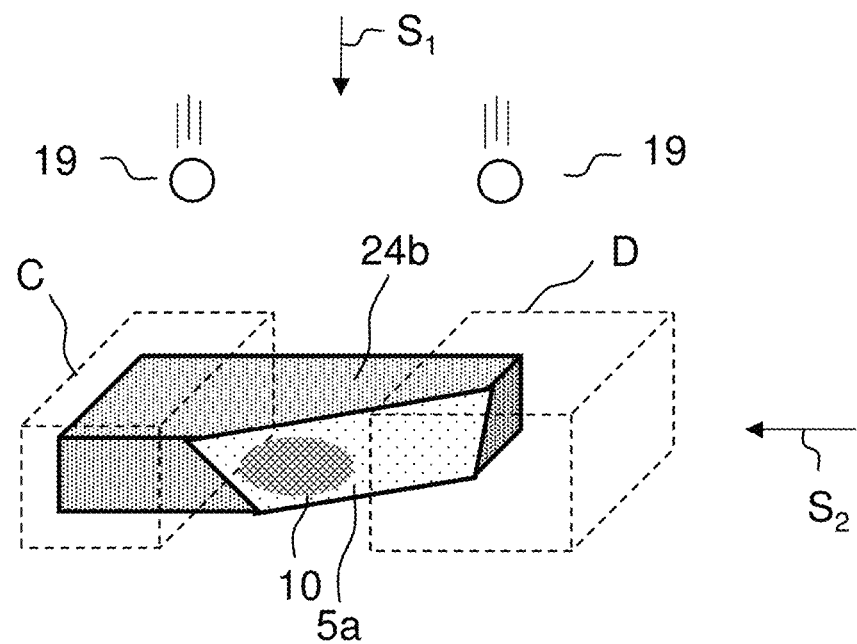
FIG. 9 is a schematic diagram for explaining a working method for extracting an observation test-sample.

FIG. 9 is a diagram schematically illustrating a working method for extracting, from a test-sample including the tilting oblique cutoff portion 5a in the embodiment, a desired observation test-sample by performing the working as will be described below.

By using a test-sample in which the tilting oblique cutoff portion 5a is produced, and while observing on each face of the top face of the test-sample 24b corresponding to the LD plan face in the figure, and of the side face thereof corresponding to the LD front face therein, being cut by a Ga-ion beam within the test-sample 24b are a region "C" surrounded on the left side of the figure by the rectangular parallelepiped of broken lines, and a region "D" surrounded on the right side of the figure by the rectangular parallelepiped of broken lines, whereby the working for extracting a test-sample for use in the observation is performed.

According to the working method (the method in which a planar TEM test-sample is used, and further cross-sectional TEM working is performed) having been explained above, the surface-part active layer 10 of the aforementioned tilting oblique cutoff portion 5a can be observed also away from any one of faces of the top face of the test-sample 24*b* and of the side face of the test-sample 24*b*, and thus, the cross-sectional working can be reached by means of first one-time working, so that a desired test-sample for use in the observation can be worked and then extracted.

Note that, under actual circumstances, it is not possible to extract a desired test-sample for use in the observation by working on the test-sample with the surface-part active layer 10 of only one place, so that, as this will be described later, it is necessary to extract a desired test-sample for use in the observation by working on the test-sample while observing the surface-part active layers 10 of two places. In addition, without being based on the method described above, it may be adopted that a working method is implemented which includes an additional process step to form an oblique cutoff portion having a tilting face at the time of cross-sectional working; however, in the embodiment, an effect can be achieved as eliminating the additional process step.

Figure 10:
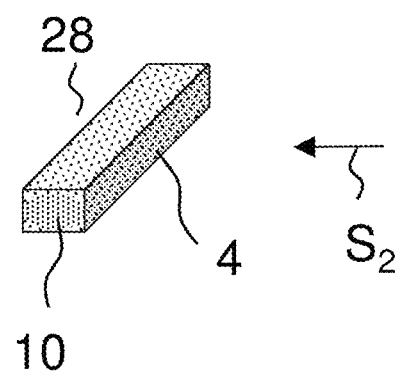
FIG. 10 is a schematic diagram illustrating an appearance for observing an observation test-sample after having performed cross-sectional TEM working by using a planar TEM test-sample.

FIG. 10 is a schematic diagram illustrating an appearance of observing a test-sample produced by means of the working method explained referring to FIG. 9 (hereinafter, the test-sample is referred to as an "observation test-sample 28"; the observation test-sample 28 is the desired test-sample). The figure shows the appearance of observing a worked face (the face referred to as an LD side face in FIG. 2) of the observation test-sample 28 from the outer side of the face. As shown in the figure, it is achievable to appropriately cut out a test-sample without cutting down a portion(s) wanted to be observed, so that it is made possible to observe the portion (s) aimed as an object. It should be note that, in FIG. 10, a portion for fixing the observation test-sample 28 is eliminated to be shown, which is the portion for fixing the observation test-sample by attaching it onto a test-sample mounting mesh 23 (the explanation will be made later in detail; hereinafter, simply referred to as the mounting mesh 23) of a transmission electron microscope (not shown in the figure) at the time of observing the observation test-sample.

According to the manner described above, at the time of first carrying out making a test-sample thinner, a cutoff portion is not formed in an across-the-thickness direction of the test-sample perpendicular with respect to an LD plan face thereof, for example, as shown in FIG. 13 at the time when the cutoff portion is formed in the test-sample, but, as shown in FIG. 5 through FIG. 9, formed is the tilting oblique cutoff portion 5*a* having a tilting face (a face having an inclination angle of an acute angle with respect to an LD plan face; as a typical inclination angle, 45 degrees) with respect to an LD plan face, whereby it is possible to produce a test-sample for a transmission electron microscope until the working for an observation test-sample reaches completion, while identifying the place of an active layer without additional working. It should be noted that, there is no need to take on the inclination angle of the aforementioned tilting face uniformly at 45 degrees; the tilting face may be made of a tilting face which combines a plurality of inclination angles including one acute angle.

Next, the explanation will be made referring to the drawings for a method of producing a test-sample whose both sides are cut off for the transmission electron microscope. In the explanation referring to FIG. 9 and FIG. 10 described above, the explanation has been made for a method of implementing the working method, by means of a test-sample in which a tilting oblique cutoff portion is formed only on one side; however, under actual circumstances, it is necessary to utilize a test-sample whose both sides are to be cut off as shown in FIG. 1A. The explanation will be made in detail including reasons therefor as follows.

Figure 11:
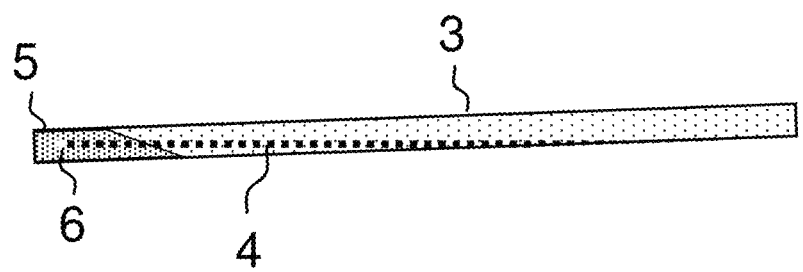
FIG. 11 is a diagram showing, by way of example, a case in which a test-sample whose tilting oblique cutoff portion is formed only on its one side is cut out.

In FIG. 11, an example of a test-sample is shown in which only its one side is cut off. The figure is a drawing, in FIG. 1B, which corresponds to the LD side face ; the explanation will be made hereinafter for the necessity to utilize a test-sample in which its both sides are cut off, while making comparison with FIG. 1B.

FIG. 1B demonstrates the view showing the LD side face in an ideal case in which a desired MQW active layer can be cut out. Because the entirety inside of the MQW active layer cannot be directly seen from its outside, it is usually difficult to cut out a desired MQW active layer in a case in which a test-sample is produced for use in the transmission electron microscope by using the test-sample whose one side is only cut off as shown in FIG. 11, because an angular displacement is caused with respect to a working direction taking on a reference. That is to say, differing from the case shown in FIG. 1B, active layer positions 6 cannot be visually identified on both the left and right sides of a test-sample, so that reference lines for determining work regions to cut out by working for an MQW active layer cannot be distinguished.

To be specific, in the test-sample in which only its one side is cut off as shown in FIG. 11, the active layer position 6 can only be visually identified within the tilting oblique cutoff portion 5 on the left side of the figure. Although the desired MQW active layer exists in the place indicated by the dotted line in the figure, the dotted line does not exist up to the right end of the test-sample as can be seen in FIG. 11, and is shown as the line being interrupted on the way to the end. That is to say, when a desired MQW active layer is cut out, it is necessary to have the dotted line described above that exists continuing approximately to the right end of a test-sample.

On the other hand, as shown in FIG. 1B, the dotted line described above exists continuing approximately to the right end of a test-sample when the test-sample having the tilting oblique cutoff portions 5 on both the left and right sides is used. In other words, the active layer positions 6 can be visually identified on both the left and right sides of the test-sample. According to the above, by using a test-sample having the tilting oblique cutoff portions 5 on both the left and right sides thereof, the active layer positions 6 existing at both the left and right ends of the dotted line (as a matter of fact, the dotted line has been the line indicating the MQW active layer) can be visually identified; and thus, by adopting the line passing through the two active layer positions 6 as a reference line, it becomes possible to reliably cut out the entirety of a desired MQW active layer.

Embodiment 2

In the manner described above, it has been shown by way of an example in which an MQW active layer is observed not through an SEM image, but through an SIM image; however, there are many cases in which the active layer cannot be sharply seen through a simple SIM image. The explanation will be made for a method of reliably cutting out the entirety of a desired MQW active layer by utilizing a sharp image even in such a case, as follows.

In the embodiment, a range(s) of the intensity of a Ga-ion beam(s) used by an FIB device is different in comparison with Embodiment 1. To be specific, in a case in which Strata 400S manufactured by FEI Company is used as an FIB device, a value of ion current taking on a determinant indicator of the intensity of a Ga-ion beam(s) is set in a range of 0.1 nA to 1.0 nA (preferably at 0.44 nA), which is in particular different from Embodiment 1. By setting the intensity of a Ga-ion current as described above, it becomes possible to sharply observe a test-sample. When the intensity is lower than the value described above, it is difficult to see a picture image(s) because the number of generations of secondary electrons is too small. On the other hand, when the intensity is higher than the value described above, it becomes difficult to determine an active region(s) because the intensity of secondary electrons as a whole becomes too strong.

Moreover, the explanation has been made for the necessity of the observation as an SIM image, at the time of performing the cross-sectional working on a planar TEM test-sample of FIG. 9 in Embodiment 1 described above, in order to verify a position of the MQW active layer when the both sides are cut down. In a case in which the observation as the SIM image is performed, different from a case in which the observation as an SEM image is performed, damage is caused on the test-sample because ions are irradiated. More particularly in a case in which a planar TEM test-sample is observed as an SIM image above its top face, an influence of damage to a test-sample becomes larger because the test-sample is thin.

In the embodiment, for example, by setting an ion current at 26 pA (picoamperes) or less in a case in which Strata 400S manufactured by FEI Company is used as an FIB device, the working can be performed without causing damage on a test-sample while keeping the observation.

In a conventional FIB working method, an influence of damage is not received because a single stage working suffices for working vertically with respect to an observation face of an electron microscope (because a test-sample aimed as an object can be obtained); however, in the working by means of two stages to perform the cross-sectional TEM working following after the planar TEM working, it is important to reduce damage due to ion irradiation.

Note that, the explanation has been made referring to the schematic figures in Embodiment 1 described above, and so, their detailed explanation has been omitted; however, it is necessary to fix an actual test-sample onto a mounting mesh for the sake of handling it into the inside of a transmission electron microscope. The explanation will be made referring to the figure for the handling at the time of working the test-sample, as follows.

FIGS. 12A and 12B are diagrams when the test-sample 24 for use in a transmission electron microscope is attached on the mounting mesh 23. In FIG. 12A (the view on the top side), the general outlines are shown when the test-sample 24 for use in the transmission electron microscope is attached on the mounting mesh 23. In addition, FIG. 12B (the view on the bottom side) is the view in which a portion indicated by the circular broken line in FIG. 12A is enlarged. Here, the mounting mesh 23 is usually made of copper or molybdenum. As for a fixation of the test-sample onto the mounting mesh 23, metal such as platinum or the like is used. A mounting place of the test-sample is specifically at a test-sample mounting portion 30.

At the test-sample mounting portion 30, a left-end portion of the test-sample is first fixed by platinum, for example. From that time onward, by having formed the tilting oblique cutoff portions 5, the MQW active layer 4 is observed. At this time, if the tilting oblique cutoff portions 5 that are larger in size than those under presumption are formed, a portion subject to mounting the test-sample onto the test-sample mounting portion 30 might result in being diminished, and so, it is feared that the test-sample might drop off; and thus, it is necessary to fix the test-sample by the length in the degree capable of maintaining its appropriate strength.

To be specific, after having formed the tilting oblique cutoff portions 5, it is desirable to fix a test-sample at a preset place of the test-sample so that a size of its left-end portion takes on a quarter or more of the overall length toward its left end. It is possible to perform the working without dropping off a test-sample by cutting out the test-sample, presuming such a fixation in advance, so that a range of a quarter or more thereof is kept remaining at the time of first cutting out the test-sample, namely, by forming tilting oblique cutoff portions where one of surface-part active layers thereat is made in the smallest size so as to be visually identified, and also by performing the working while observing so that a fixation portion is kept remaining in the test-sample at the time of forming the tilting oblique cutoff portions thereat.

In the disclosure of the application concerned, various exemplary embodiments and implementation examples are described; however, various features, aspects and functions described in one or a plurality of embodiments are not necessarily limited to the applications of a specific embodiment(s), but are applicable in an embodiment(s) solely or in various combinations.

Therefore, limitless modification examples not being exemplified can be presumed without departing from the scope of the technologies disclosed in Description of the disclosure of the application concerned. For example, there arise cases which are included as a case in which at least one constituent element is modified, added or eliminated, and further a case in which at least one constituent element is extracted and then combined with a constituent element(s) of another embodiment.

EXPLANATION OF NUMERALS AND SYMBOLS

Numeral "1" designates an LD plan face; "2," LD front face; "3," LD side face; "4," MQW active layer; "5," "5*a*," "5*b*," tilting oblique cutoff portion; "6," active layer position; "7," laser beam; "10," surface-part active layer; "11," "11*a*," "11*b*," work region; "12," contact layer; "13," "15," clad layer; "14," block layer; "16," substrate; "18," laser-beam emitting front end-face; "19," Ga-ion beam; "20," upper electrode; "21," lower electrode; "22," cutout region; "23," mounting mesh; "24," "24*a*," "24*b*," test-sample; "25," cross-sectional TEM test-sample; "26," oblique cutoff portion; "27," massive body; "28," observation test-sample; and "30," test-sample mounting portion.

What is claimed is:

1. A method of producing a test-sample for a transmission electron microscope, comprising:
   a process step of cutting out, from a laser diode being a workpiece, a massive body in a rectangular parallelepiped shape including a multiple quantum well active layer residing in the laser diode;
   a process step of producing a test-sample in which tilting oblique cutoff portions are formed, at two corner portions contiguously bordering on an upper surface of the massive body, each tilting with respect to the upper surface of the massive body;
   a process step of making the test-sample thinner by working on the test-sample from a surface thereof until a thickness thereof reaches where the multiple quantum well active layer therein can be observed; and
   a process step of cutting out an observation test-sample being columnar, from a test-sample formed with the tilting oblique cutoff portions, by using two of surface-part active layers each made of portions of the multiple quantum well active layer.

2. The method of producing a test-sample for a transmission electron microscope as set forth in claim 1, wherein the tilting oblique cutoff portions each have tilting faces constituted of a plurality of different inclination angles.

3. The method of producing a test-sample for a transmission electron microscope as set forth in claim 1, wherein
the tilting oblique cutoff portions are worked by a focused ion beam device while observing the surface-part active layers each through images of a scanning ion microscope, and also
an observation of the test-sample is performed by a transmission electron microscope of ultra-high voltage at the process step of making the test-sample thinner.

4. The method of producing a test-sample for a transmission electron microscope as set forth in claim 2, wherein
the tilting oblique cutoff portions are worked by a focused ion beam device while observing the surface-part active layers each through images of a scanning ion microscope, and also
an observation of the test-sample is performed by a transmission electron microscope of ultra-high voltage at the process step of making the test-sample thinner.

5. The method of producing a test-sample for a transmission electron microscope as set forth in claim 3, wherein a value of a gallium-ion current of the focused ion beam device is set at twenty-six picoamperes or less at a time of observing the surface-part active layers each as images of the scanning ion microscope.

6. The method of producing a test-sample for a transmission electron microscope as set forth in claim 4, wherein a value of a gallium-ion current of the focused ion beam device is set at twenty-six picoamperes or less at a time of observing the surface-part active layers each as images of the scanning ion microscope.

7. The method of producing a test-sample for a transmission electron microscope as set forth in claim 1, wherein the tilting oblique cutoff portions are portions where, between the two surface-part active layers thereat, one of which is produced in a smallest size whose surface-part active layer is visually identified.

8. The method of producing a test-sample for a transmission electron microscope as set forth in claim 2, wherein the tilting oblique cutoff portions are portions where, between the two surface-part active layers thereat, one of which is produced in a smallest size whose surface-part active layer is visually identified.

9. The method of producing a test-sample for a transmission electron microscope as set forth in claim 3, wherein the tilting oblique cutoff portions are portions where, between the two surface-part active layers thereat, one of which is produced in a smallest size whose surface-part active layer is visually identified.

10. The method of producing a test-sample for a transmission electron microscope as set forth in claim 4, wherein the tilting oblique cutoff portions are portions where, between the two surface-part active layers thereat, one of which is produced in a smallest size whose surface-part active layer is visually identified.

11. The method of producing a test-sample for a transmission electron microscope as set forth in claim 5, wherein the tilting oblique cutoff portions are portions where, between the two surface-part active layers thereat, one of which is produced in a smallest size whose surface-part active layer is visually identified.

12. The method of producing a test-sample for a transmission electron microscope as set forth in claim 6, wherein the tilting oblique cutoff portions are portions where, between the two surface-part active layers thereat, one of which is produced in a smallest size whose surface-part active layer is visually identified.

\* \* \* \* \*